(12) United States Patent
Fukushima et al.

(10) Patent No.: US 11,390,826 B2
(45) Date of Patent: *Jul. 19, 2022

(54) GREASE COMPOSITION, MACHINE COMPONENT, AND STARTER OVERRUNNING CLUTCH

(71) Applicants: DENSO CORPORATION, Kariya (JP); DUPONT TORAY SPECIALTY MATERIALS KABUSHIKI KAISHA, Tokyo (JP)

(72) Inventors: Yoshinori Fukushima, Kariya (JP); Koji Sakakibara, Kariya (JP); Youichi Hasegawa, Kariya (JP); Makoto Mori, Kariya (JP); Yuji Masamura, Hadano (JP)

(73) Assignees: DENSO CORPORATION, Kariya (JP); DUPONT TORAY SPECIALTY MATERIALS KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/894,729

(22) Filed: Jun. 5, 2020

(65) Prior Publication Data

US 2020/0299607 A1    Sep. 24, 2020

Related U.S. Application Data

(63) Continuation of application No. 16/082,713, filed as application No. PCT/JP2017/001927 on Jan. 20, 2017, now abandoned.

(30) Foreign Application Priority Data

Mar. 11, 2016    (JP) .................. 2016-047996

(51) Int. Cl.
  *C10M 169/06*    (2006.01)
  *C10M 135/18*    (2006.01)
  *C10M 137/10*    (2006.01)
  *C10M 141/10*    (2006.01)
  *C10M 107/50*    (2006.01)
  *F16D 7/02*      (2006.01)
  *C10M 169/00*    (2006.01)
  *C10M 117/02*    (2006.01)
  *F16D 41/067*    (2006.01)
  *C10N 10/04*     (2006.01)
  *C10N 30/08*     (2006.01)
  *C10N 40/04*     (2006.01)
  *C10N 50/10*     (2006.01)
  *C10N 10/02*     (2006.01)
  *C10N 30/06*     (2006.01)

(52) U.S. Cl.
  CPC ........ *C10M 169/06* (2013.01); *C10M 107/50* (2013.01); *C10M 117/02* (2013.01); *C10M 135/18* (2013.01); *C10M 137/10* (2013.01); *C10M 141/10* (2013.01); *C10M 169/00* (2013.01); *F16D 7/02* (2013.01); *F16D 41/067* (2013.01); *C10M 2207/1265* (2013.01); *C10M 2207/1276* (2013.01); *C10M 2207/1285* (2013.01); *C10M 2219/068* (2013.01); *C10M 2223/045* (2013.01); *C10M 2223/061* (2013.01); *C10M 2229/045* (2013.01); *C10M 2229/0415* (2013.01); *C10M 2229/0425* (2013.01); *C10M 2229/0515* (2013.01); *C10N 2010/02* (2013.01); *C10N 2010/04* (2013.01); *C10N 2030/06* (2013.01); *C10N 2030/08* (2013.01); *C10N 2040/04* (2013.01); *C10N 2050/10* (2013.01)

(58) Field of Classification Search
  CPC .............. C10M 169/06; C10M 169/00; C10M 117/02; C10M 135/18; C10M 137/10; C10M 141/10; C10M 107/50; C10M 2229/045; C10M 2207/1265; C10M 2229/0425; C10M 2207/1285; C10M 2207/1276; C10M 2229/0515; C10M 2219/068; C10M 2229/0415; C10M 2223/045; C10M 2223/061; F16D 41/067; F16D 7/02; C10N 2010/04; C10N 2030/08; C10N 2040/04; C10N 2050/10; C10N 2010/02; C10N 2030/06
  See application file for complete search history.

(56) References Cited

U.S. PATENT DOCUMENTS

| 4,728,450 A | 3/1988 | Toya et al. |
| 4,842,753 A | 6/1989 | Mori et al. |

(Continued)

FOREIGN PATENT DOCUMENTS

| CN | 1052891 A | 7/1991 |
| CN | 1253168 A | 5/2000 |

(Continued)

OTHER PUBLICATIONS

International Search Report with translation for PCT/JP2017/001943 dated Mar. 14, 2017, 5 pages.
English language abstract and machine assisted translation for JPH034036 (A) extracted from j-platpat.inpit.go.jp database on Jun. 4, 2018 and worldwide.espacenet.com database, 7 pages.
English language abstract and machine assisted translation for JPH05132689 (A) extracted from j-platpat.inpit.go.jp database on Jun. 4, 2018 and worldwide.espacenet.com database, 7 pages.

(Continued)

*Primary Examiner* — Pamela H Weiss
(74) *Attorney, Agent, or Firm* — Warner Norcross + Judd LLP

(57) ABSTRACT

A silicone grease composition having high friction characteristics and wear characteristics is disclosed. The silicone grease composition is provided by adding a zinc salt (B) containing, at a mass ratio from 1:99 to 99:1, a zinc dialkyldithiophosphate (B1) and a zinc dialkyldithiocarbamate (B2) as an extreme-pressure additive to a silicone oil (A). A method for transmitting torque of a clutch or a torque limiter mechanism is also disclosed.

4 Claims, No Drawings

(56) References Cited

U.S. PATENT DOCUMENTS

| | | | |
|---|---|---|---|
| 5,318,160 A | | 6/1994 | Oomi et al. |
| 5,512,188 A | * | 4/1996 | Kinoshita ............ C10M 135/18 508/137 |
| 5,908,815 A | | 6/1999 | Shen |
| 6,022,835 A | * | 2/2000 | Fletcher ............... C10M 141/10 508/365 |
| 6,191,080 B1 | | 2/2001 | Nakanishi et al. |
| 6,352,961 B1 | | 3/2002 | Iso et al. |
| 2005/0003970 A1 | * | 1/2005 | Ohmura ............... C10M 169/06 508/365 |
| 2007/0173420 A1 | | 7/2007 | Iso |
| 2008/0026963 A1 | | 1/2008 | Sakamoto et al. |
| 2008/0161214 A1 | | 7/2008 | Asakura et al. |
| 2008/0196995 A1 | | 8/2008 | Mikami et al. |
| 2008/0271967 A1 | * | 11/2008 | Nakatani ............. F16C 33/6633 192/45.006 |
| 2009/0124400 A1 | * | 5/2009 | Mikami ................. F16D 41/07 464/182 |
| 2010/0173807 A1 | | 7/2010 | Nagumo et al. |
| 2011/0059875 A1 | | 3/2011 | Tanimura et al. |
| 2011/0183876 A1 | | 7/2011 | Imai et al. |
| 2015/0232784 A1 | * | 8/2015 | Aida .................... C10M 169/00 508/364 |
| 2015/0252283 A1 | | 9/2015 | Sekiguchi et al. |
| 2017/0002285 A1 | * | 1/2017 | Hirooka ............... C10M 107/50 |
| 2019/0085257 A1 | | 3/2019 | Fukushima et al. |
| 2019/0085260 A1 | | 3/2019 | Fukushima et al. |

FOREIGN PATENT DOCUMENTS

| | | | | |
|---|---|---|---|---|
| CN | 1922295 | A | | 2/2007 |
| CN | 101679904 | A | | 3/2010 |
| CN | 104769087 | A | | 7/2015 |
| CN | 106029851 | A | | 10/2016 |
| EP | 0508115 | A1 | | 10/1992 |
| EP | 1510569 | A1 | | 3/2005 |
| EP | 1911994 | A1 | | 4/2008 |
| JP | S63275696 | A | | 11/1988 |
| JP | H034036 | A | | 1/1991 |
| JP | 04279698 | A | | 10/1992 |
| JP | 05132689 | A | * | 5/1993 |
| JP | H05132689 | A | | 5/1993 |
| JP | H05171171 | A | | 7/1993 |
| JP | H05230486 | A | | 9/1993 |
| JP | H06279777 | A | | 10/1994 |
| JP | H08143883 | A | | 6/1996 |
| JP | H093473 | A | | 1/1997 |
| JP | H1161168 | A | | 3/1999 |
| JP | 2004323586 | A | | 11/2004 |
| JP | 2006077967 | A | | 3/2006 |
| JP | 2006182909 | A | | 7/2006 |
| JP | 2007255478 | A | | 10/2007 |
| JP | 2008308587 | A | | 12/2008 |
| JP | 2010112235 | A | | 5/2010 |
| JP | 2015151516 | A | | 8/2015 |
| JP | 2015151516 | A | * | 8/2015 .......... C10M 125/10 |
| WO | 2006109541 | A1 | | 10/2006 |
| WO | 2006132349 | A1 | | 12/2006 |
| WO | 2011142411 | A1 | | 11/2011 |

OTHER PUBLICATIONS

English language abstract and machine assisted translation for JPH05230486 (A) extracted from j-platpat.inpit.go.jp database on Jun. 4, 2018, 6 pages.

English language abstract and machine assisted translation for JPH08143883 (A) extracted from j-platpat.inpit.go.jp database on Jun. 4, 2018, 14 pages.

English language abstract and machine assisted translation for JPH093473 (A) extracted from j-platpat.inpit.go.jp database on Jun. 4, 2018, 10 pages.

English language abstract and machine assisted translation for JP2004323586 (A) extracted from j-platpat.inpit.go.jp database on Jun. 4, 2018, 10 pages.

English language abstract and machine assisted translation for JP2010112235 (A) extracted from j-platpat.inpit.go.jp database on Jun. 4, 2018, 10 pages.

Machine assisted English translation of JPH06279777A obtained from https://patents.google.com on Nov. 18, 2019, 8 pages.

Machine assisted English translation of JPH1161168A obtained from https://patents.google.com on Nov. 18, 2019, 10 pages.

Machine assisted English translation of JP2007255478A obtained from https://patents.google.com on Nov. 18, 2019, 6 pages.

Machine assisted English translation of JP2008308587A obtained from https://patents.google.com on Nov. 18, 2019, 7 pages.

Machine assisted English translation of WO2011142411A1 obtained from https://patents.google.com on Nov. 18, 2019, 10 pages.

Machine assisted English translation of JP2006077967A obtained from https://patents.google.com on Nov. 19, 2019, 8 pages.

English translation of International Search Report for PCT/JP2017/001927 dated Apr. 4, 2017, 3 pages.

Office Action and Search Report for CN Appl. No. 201780015596.4 dated Mar. 10, 2021.

Machine assisted English Translation of CN1052891A obtained from https://worldwide.espacenet.com on May 7, 2021, 13 pages.

Machine assisted English Translation of CN1253168A obtained from https://worldwide.espacenet.com on May 7, 2021, 11 pages.

* cited by examiner

GREASE COMPOSITION, MACHINE COMPONENT, AND STARTER OVERRUNNING CLUTCH

CROSS-REFERENCE TO RELATED APPLICATIONS

This application is a Continuation of U.S. patent application Ser. No. 16/082,713 filed on 6 Sep. 2018, which is the National Stage of International Application No. PCT/JP2017/001927 filed on 20 Jan. 2017, which claims priority to and all advantages of Japanese Patent Appl. No. 2016-047996 filed on 11 Mar. 2016, the content of which is hereby incorporated by reference.

TECHNICAL FIELD

The present invention relates to a grease composition containing a silicone oil. More particularly, the present invention relates to a grease composition which is suited for use in a lubrication part of a starter overrunning clutch, the grease composition containing zinc dialkyldithiophosphate and zinc dialkyldithiocarbamate as extreme-pressure additives and containing a silicone oil as a base oil, and the grease composition having a high coefficient of friction and excellent wear resistance. In addition, the present invention relates to a machine component in which the grease composition is enclosed, and particularly to an overrunning clutch.

BACKGROUND ART

The difference in thickness—that is, the weight—of a material of a mechanical part is determined by the degree to which the safety coefficient of strength is set at the time of design. In particular, in the case of a part for an automobile, taking into consideration the effects on the global environment such as exhaust gas regulation or global warming, it is essential to reduce weight by using lightweight materials, reducing the thickness, reducing the shaft diameter, or the like, which will leave little margin in terms of strength. Therefore, to alleviate physical impact with a slip mechanism, a clutch or torque limiter mechanism is applied to a greater variety of parts than that had been done previously. In addition, an idling STOP for stopping the engine while stopped at a traffic signal has been put into practical application as a countermeasure against automobile exhaust gas, which is one cause of global warming. Therefore, the engine is started with a starter each time the vehicle is restarted after stopping at a traffic signal, and the frequency with which the engine starts has increased dramatically.

The part where the torque is the greatest and the conditions are most severe in a clutch or a torque limiter mechanism is the overrunning clutch of the engine starter of an automobile. The starter of an automobile is used in a severe environment in which it is exposed to temperatures ranging from an extremely low temperature of −40° C. to a high temperature of 120° C. because it is installed near the exhaust pipe. A grease composition is used for the lubrication of a starter overrunning clutch. Presently, a grease composition containing a silicone oil as a base oil is primarily used. This is because the coefficient of friction of a silicone oil is high, but since the surface tension of a silicone oil is smaller than other oils at 20 to 25 dyn/cm$^2$, there is a characteristic that a lubricating film is difficult to form and a boundary lubrication state is likely to occur. The durability count in the market of overrunning clutches for engine starters using commercially available silicone grease is currently approximately 30,000 to 50,000 times. When idling STOP is incorporated, the clutch wears down and stops transmitting torque in a short amount of time (a few years) due to the high frequency of use. As a result, the motor idles, resulting in a state in which the engine does not start.

In this way, the grease composition used in the lubricating part of a clutch or a torque limiter mechanism absolutely needs to have a high coefficient of friction and excellent enhancement of wear resistance as characteristics.

Taking into consideration the circumstances described above, extreme-pressure additives are used as additives for reducing the friction and wear between two metal surfaces and for preventing sticking, and there are many known grease compositions containing extreme-pressure additives. For example, JP 2010-112235 A describes a lubricating oil in which at least one of zinc dialkyldithiophosphate or zinc dialkyldithiocarbamate is added to a silicone oil as a lubricating oil to be circulated within a screw compressor. JP 2004-323586 A describes that a zinc compound is added to a grease composition used in electrical components of an automobile, and that at least one type of zinc dialkyldithiophosphate, zinc dialkyldithiocarbamate, or zinc oxide is used as the zinc compound. JP H09-3473 A describes, phosphate esters, phosphite esters, zinc dialkyldithiophosphate, zinc dialkyldithiocarbamate, and sulfur compounds as antiwear additives to be added to the heat-resistant lubricating oil composition used in an automobile engine. JP H08-143883 A describes a grease composition which is suitable for use in a fan clutch bearing for an automobile, the grease composition having high heat resistance and containing a fluorosilicone oil as a base oil, and also describes zinc dithiophosphate, zinc dithiocarbamate, phosphates, and alkyl sulfites as extreme-pressure additives that can be added. JP H05-230486 A describes a silicone grease composition containing zinc dialkyldithiophosphate, which is used in an overrunning clutch of an automobile starter.

PRIOR ART DOCUMENTS

Patent Documents

Patent Document 1: JP 2010-112235 A
Patent Document 2: JP 2004-323586 A
Patent Document 3: JP H09-3473 A
Patent Document 4: JP H08-143883 A
Patent Document 5: JP H05-230486 A

SUMMARY OF THE INVENTION

Problems to be Solved by the Invention

In response to the reduction in size and weight and increasingly harsh usage conditions of clutches or torque limiter mechanisms of recent years, and due to increases in the number of times that a starter for an automobile engine is used, in particular, there is a demand for a grease composition which exhibits even higher friction characteristics and wear characteristics than conventional grease compositions. Therefore, an object of the present invention is to provide a grease composition containing a silicone oil as a base oil which exhibits high friction characteristics and wear characteristics.

Means for Solving the Problems

As a result of conducting dedicated research, the present inventors discovered that a grease composition obtained by adding a zinc salt (B) containing, at a mass ratio from 1:99 to 99:1, a zinc dialkyldithiophosphate (B1) and a zinc dialkyldithiocarbamate (B2) as extreme-pressure additives to a silicone oil (A) has high friction characteristics and wear characteristics and is suitable for use in a power transmission device, and in a starter overrunning clutch, in particular.

Therefore, the present invention relates to a grease composition containing: a silicone oil (A); and a zinc salt (B) containing, at a mass ratio from 1:99 to 99:1, a zinc dialkyldithiophosphate (B1) and a zinc dialkyldithiocarbamate (B2).

The content of the zinc salt (B) is preferably not less than 5 mass % and not greater than 30 mass % relative to the total amount of the composition. In addition, the zinc salt (B) preferably contains the zinc dialkyldithiophosphate (B1) and the zinc dialkyldithiocarbamate (B2) at a mass ratio from 2:98 to 50:50.

The grease composition of the present invention may further contain one or more types of thickeners (C) selected from lithium soaps and lithium complex soaps.

The content of the silicone oil (A) is preferably in the range of not less than 50 mass % and not greater than 95 mass % relative to the total amount of the composition, and the silicone oil (A) preferably contains an aromatic hydrocarbon group in the molecule.

In addition, the present invention relates to a grease composition for a power transmission device, the grease composition containing: a silicone oil (A); and a zinc salt (B) containing, at a mass ratio from 1:99 to 99:1, a zinc dialkyldithiophosphate (B1) and a zinc dialkyldithiocarbamate (B2). Further, the grease composition of the present invention may optionally contain a partial ester (D) of a polyhydric alcohol to enhance the wear resistance.

Further, the present invention relates to a machine component in which the grease composition of the present invention is enclosed, and in particular, a clutch or a torque limiter mechanism.

In addition, the present invention relates to an overrunning clutch in which the grease composition of the present invention is enclosed in a clutch cam chamber formed from an outer clutch and an inner clutch.

Effects of the Invention

The grease composition of the present invention exhibits a high coefficient of friction and excellent enhancement of wear resistance. Further, the grease composition can be used in a wide temperature range from low to high temperatures. In comparison to a case where zinc dialkyldithiophosphate or zinc dialkyldithiocarbamate is used alone or a case where other sulfur-based additives are used, the grease composition yields higher friction characteristics and wear characteristics. By using a specific combination of a zinc dialkyldithiophosphate and a zinc dialkyldithiocarbamate, it is possible to satisfy the contradictory requirements of high friction and low wear required for an overrunning clutch, which was impossible with known products.

Mode for Carrying Out the Invention

A first aspect of the present invention is a grease composition containing: a silicone oil (A); and a zinc salt (B) containing, at a mass ratio from 1:99 to 99:1, a zinc dialkyldithiophosphate (B1) and a zinc dialkyldithiocarbamate (B2).

The silicone oil serving as component (A) of the present invention is a liquid at ambient temperature (25° C.) and may have a straight-chain or a branched-chain structure. The chemical structure thereof is not particularly limited, but an example thereof is a polyorganosiloxane (silicone oil), which is a liquid at ambient temperature, represented by the following general formula (I).

$$R^1_a SiO_{(4-a)/2} \quad (I)$$

(where the $R^1$ moieties are groups selected from monovalent hydrocarbon groups and may be the same as or different than one another. Here, a is preferably from 1.8 to 2.2 and more preferably from 1.9 to 2.1 from the perspective of the ease of synthesizing liquid silicone.)

The $R^1$ moieties in formula (I) above may each independently be an aliphatic hydrocarbon group or an aromatic hydrocarbon group. Preferably, the silicone oil used in the grease composition of the present invention contains an aromatic hydrocarbon group as at least one of the $R^1$ moieties.

The carbon number of the hydrocarbon group of $R^1$ may be from 1 to 8. Examples of $R^1$ include alkyl groups such as a methyl group, an ethyl group, a propyl group, and a hexyl group, cyclohexyl groups such as a cyclopentyl group and a cyclohexyl group, alkenyl groups such as a vinyl group and an allyl group, aryl groups such as a phenyl group and a tolyl group, aralkyl groups such as a 2-phenylethyl group and a 2-methyl-2-phenylethyl group, and halogenated hydrocarbon groups such as a 3,3,3-trifluoropropyl group, a 2-(perfluorobutyl)ethyl group, a 2-(perfluorooctyl)ethyl group, and a p-chlorophenyl group, and a methyl group, a vinyl group, and a phenyl group are preferable. The silicone oil particularly preferably contains a methyl group and a phenyl group.

Examples of specific silicone oils include the following silicones (1) to (3) due to their versatility as greases. The use of (1) methylphenyl silicone and (2) dimethylsilicone, which have a particularly high coefficient of friction, is preferable.

(1) Methylphenyl Silicone:

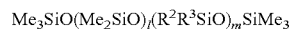

$$Me_3SiO(Me_2SiO)_l(R^2R^3SiO)_mSiMe_3$$

(where Me is a methyl group; $R^2$ is a methyl group or a phenyl group; $R^3$ is a phenyl group; l is 0 or a positive integer; and m is a positive integer)

Specific examples include the following:

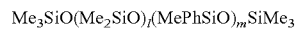

$$Me_3SiO(Me_2SiO)_l(MePhSiO)_mSiMe_3$$

and

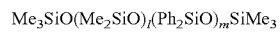

$$Me_3SiO(Me_2SiO)_l(Ph_2SiO)_mSiMe_3$$

(2) Dimethylsilicone

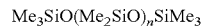

$$Me_3SiO(Me_2SiO)_nSiMe_3$$

(where Me is a methyl group; and n is a positive integer)

(3) Fluorinated Alkyl-Modified Silicone:

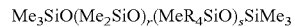

$$Me_3SiO(Me_2SiO)_r(MeR_4SiO)_sSiMe_3$$

(where Me is a methyl group; $R^4$ is a fluorinated alkyl group; r is 0 or a positive integer; and s is a positive integer)

A specific example is the following:

$$Me_3SiO(Me(CF_3CH_2CH_2)SiO)_sSiMe_3$$

Note that the above-described silicones (1) to (3) may be branched silicones in which a methyl group of a side chain is substituted with another siloxane group, and a terminal group may be substituted with a hydroxyl group, a vinyl group, or the like.

A particularly preferable silicone oil is the methylphenyl silicone represented by (1) above. When the phenyl group content of this methylphenyl silicone is less than 1 mol % relative to all organic groups, the heat resistance becomes low, whereas when the content exceeds 50 mol %, temperature-induced changes in viscosity become large, and the pour point also increases, while the torque at low temperatures becomes large. Therefore, the phenyl group content is preferably in the range from 1 to 50 mol %, more preferably from 3 to 25 mol %, and particularly preferably from 3 to 10 mol %.

When the kinetic viscosity of the silicone oil used in the present invention is less than 20 cSt, the silicone oil is easily separated from the grease, whereas when the kinetic viscosity exceeds 10000 cSt, the torque at low temperatures becomes large due to viscous resistance, and heat is generated at the time of high-speed revolution, which induces the degradation of the grease. Therefore, the kinetic viscosity is preferably from 20 to 1000 cSt and more preferably from 50 to 500 cSt at 25° C. The measurement of the kinetic viscosity is a value measured in accordance with "JIS Z 8803".

In the grease composition of the present invention, the content of the silicone oil may be not less than 10 wt. % and not greater than 99 wt. % relative to the total amount of the composition, and the content is preferably not less than 30 wt. % and not greater than 97 wt. % and more preferably not less than 50 wt. % and not greater than 95 wt. %.

By using a silicone oil such as that described above as a base oil, a grease exhibiting the high friction required for an overrunning clutch can be realized because the silicone oil is an oil agent with a high coefficient of friction and exhibits excellent heat resistance and minimal temperature dependence of changes in viscosity.

The grease composition of the present invention contains, as an extreme-pressure additive, a zinc salt (B) containing, at a mass ratio from 1:99 to 99:1, a zinc dialkyldithiophosphate (B1) and a zinc dialkyldithiocarbamate (B2). The combination of the component (B1) and the component (B2) makes it possible to enhance the friction characteristics and the wear characteristics of the silicone grease composition. Such high friction characteristics and wear characteristics are not imparted when the component (B1) or the component (B2) is used alone. In addition, such an effect is not imparted when another typical sulfur-based additive is used.

The zinc dialkyldithiophosphate of the component (B1) used in the present invention is preferably represented by the following general formula (II).

$$[R^5O)_2P(=S)-S]_2-Zn \quad (II)$$

(where $R^5$ is a primary or secondary alkyl having from 1 to 24 carbons. $R^5$ is particularly preferably a primary or secondary alkyl group having from 3 to 12 carbons.)

The zinc dialkyldithiocarbamate of the component (B2) used in the present invention is preferably represented by the following general formula (III).

$$[R^6_2N-C)(=S)-S]_2-Zn \quad (III)$$

(where $R^6$ is a primary or secondary alkyl group having from 1 to 24 carbons. $R^6$ is particularly preferably a primary or secondary alkyl group having from 1 to 8 carbons.) In particular, $R^6$ is preferably a methyl group, an ethyl group, and a propynyl group)

In the grease composition of the present invention, the content of the zinc salt (B) may be not less than 1 mass % and not greater than 50 mass % relative to the entire composition, and the content is preferably not less than 5 mass % and not greater than 40 mass % and more preferably not less than 5 mass % and not greater than 30 mass %.

The mass ratio of the zinc dialkyldithiophosphate and the zinc dialkyldithiocarbamate is preferably from 1:99 to 40:60 and more preferably from 2:98 to 50:50. When the proportion of the zinc dialkyldithiophosphate is greater than that of the zinc dialkyldithiocarbamate, the coefficient of friction decreases. Therefore, the proportion of the zinc dialkyldithiophosphate is preferably smaller than the proportion of the zinc dialkyldithiocarbamate.

The grease composition of the present invention may further contain an organic or inorganic thickener. The grease composition preferably contains a lithium soap and/or a lithium complex soap, which are organic thickeners, as a component (C). By containing a lithium soap, the grease composition can be imparted with heat resistance, shear stability, and water resistance. In addition, by containing a lithium complex soap, the grease composition can be imparted with even greater shear stability and heat resistance than those imparted by a lithium soap.

The grease composition of the present invention may further contain an organic thickener such as a urea compound or an inorganic thickener such as silica and bentonite.

In the grease composition of the present invention, the content of the thickener may be not less than 1 mass % and not greater than 30 mass % relative to the total amount of the composition, and the content is preferably not less than 2 mass % and not greater than 25 mass % and more preferably not less than 2.5 mass % and not greater than 20 mass %.

The grease composition of the present invention may optionally further contain a partial ester of a polyhydric alcohol as a component (D). This ester is used as an oily agent and adsorbs to one of the metals in a hydroxyl group portion. This may prevent the hydrocarbon groups extending from the ester bonds from coming into contact with other metals and thereby enhance the lubricating action. Note that, as necessary, the content of the component (D) may be not greater than 30 mass %, or the component (D) may not be contained at all.

The partial ester of the polyhydric alcohol described above can be obtained through a condensation reaction of a polyhydric alcohol and a monovalent fatty acid. Specific examples of polyhydric alcohols include glycerin, trimethylol propane, diglycerin, erythritol, pentaerythritol, triglycerin, sorbitol, and mannitol. Pentaerythritol is particularly preferable. In addition, the monovalent fatty acid forming a partial ester with the polyhydric alcohol preferably has from 5 to 20 carbons, and caproic acid (C6), enantoic acid (C7), and caprylic acid (C8) are particularly preferable examples. The partial ester of the polyhydric alcohol may have a pour point lower than 40° C. Specifically, the partial ester may be an ester of a pentaerythritol fatty acid (C6-C8).

In the grease composition of the present invention, the content of the partial ester of the polyhydric alcohol may be not less than 0 mass % and not greater than 30 mass % relative to the total amount of the composition, and is preferably not less than 0 mass % and not greater than 20 mass %. The content of the component (D) may be 0 mass % as necessary.

The grease composition of the present invention may further contain additives which are ordinarily used in grease compositions, such as antioxidants, corrosion inhibitors, metal deactivators, detergent dispersant extreme-pressure additives other than those described above, anti-forming agents, anti-emulsifiers, and oiliness enhancers. These may be used alone or as a mixture of two or more types thereof. The content thereof may be from 0 wt. % to 5 wt. % relative to the total amount of the composition as long as the effect of the present invention is not inhibited.

The grease composition of the present invention is used in the lubricating part of a power transmission device. A power transmission device refers to a series of mechanisms for transmitting the power of the engine to the wheels. A power transmission device includes a clutch, a transmission, a propeller shaft, a coupling, a final reduction gear, a driving axle, and the like. The grease composition of the present invention is preferably used in the lubricating part of a clutch, and more preferably in the lubricating part of a starter overrunning clutch.

A second aspect of the present invention is a machine part in which the grease composition of the present invention is enclosed, and preferably a clutch or a torque limiter mechanism. A starter overrunning clutch is particularly preferable in which the grease composition of the present invention is enclosed. A starter overrunning clutch includes a cylindrical outer clutch and a cylindrical inner clutch disposed concentrically on the inner peripheral side of the outer clutch, and a clutch roller is displaced in the circumferential direction within a clutch cam chamber formed by the outer clutch and the inner clutch. The grease composition of the present invention can be enclosed in this clutch cam chamber.

Another aspect of the present invention is a method of increasing the friction of the lubricating part of a power transmission device and/or reducing the wear of the lubricating part, wherein the grease composition of the present invention is enclosed in the power transmission device. An additional example is a method of increasing the friction of the lubricating part of an overrunning clutch and/or reducing the wear of the lubricating part, wherein the grease composition of the present invention is enclosed in a clutch cam chamber formed by the outer clutch and the inner clutch of the overrunning clutch.

In addition, another aspect of the present invention is the use of the grease composition of the present invention for increasing the friction of the lubricating part of a power transmission device and/or reducing the wear of the lubricating part. An additional example is the use of the grease composition of the present invention for increasing the friction of the lubricating part of an overrunning clutch and/or reducing the wear of the lubricating part.

INDUSTRIAL APPLICABILITY

The grease composition of the present invention has a high coefficient of friction and therefore has a high torque transmission as well as high wear resistance. The grease composition is therefore suited for use in a lubricating part of a clutch or a torque limiter mechanism which is used with high frequency, and a starter overrunning clutch, in particular.

EXAMPLES

The present invention will be described specifically using examples and comparative examples hereinafter, but the present invention is not limited to the examples below.
Preparation of Grease Composition
A methylphenyl silicone (A), a zinc dialkyldithiophosphate (B1) and a zinc dialkyldithiocarbamate (B2), and a thickener (C) ("Li soap" or "Li complex soap") were mixed in the composition listed in Table 2 (mixed to adjust the consistency to approximately 300). After the entire mixture was stirred, the mixture was adjusted to grades of consistency Nos. 1 and 2 using three roll mills to prepare the grease compositions of Examples 1 to 7 and Comparative Examples 1 to 7.

Note that the details of each component are as follows.
Methylphenyl silicone (A): available from Dow-Corning Corporation, DC5 10-100 mm$^2$/s (25° C.)
Zinc dialkyldithiophosphate (B1): bis(2-ethylhexyl)zinc dithiophosphate
Zinc dialkyldithiocarbamate (B2): zinc dimethyldithiocarbamate
Thickener (C):
Li soap: lithium stearate
Li complex soap: 4:1 mixture of lithium (12-hydroxystearate) and dilithium azelate salt
Friction Test and Wear Test
The coefficient of friction was measured in accordance with a barbell plate test, and the size of wear marks was further measured. Specifically, an opposite material with a barbell shape was brought into contact with the plate surface, and the plate was rotated while applying a load in this state so as to slide the surface of the opposite material and the plate surface with continuous contact therebetween. The opposite material was a Fe—Cr alloy steel formed from two discs 13 mm in diameter and 2 mm thick and a shaft connecting the central portions of these two discs. The portion of the opposite material which was in sliding contact with the plate surface was the peripheral edge portion of the discs.
(1) Test Piece Material
Barbell-type test piece: SCr415
Plate-type test piece: SUJ2
(2) Test Method
A state of cylindrical line contact was assumed so as to achieve a stable state of contact with little one-sided contact even under relatively low surface pressure conditions. The test conditions of the friction test and the wear test are shown in Table 1. The coefficient of friction was measured by measuring the torque in the sliding direction with a load cell. The wear width (μm) of wear marks was measured with the measurement function of a stereoscopic microscope (available from Olympus, model DP-21).
(3) Test Conditions

TABLE 1

| Item | Conditions |
|---|---|
| Test conditions of friction test | |
| Load (N) | 800 |
| Surface pressure (MPa) | 1015 |
| Sliding rate (m/s) | 0.388 |
| Testing time (s) | 15 |
| Test temperature (° C.) | −30 |
| Test conditions of wear test | |
| Load (N) | 40 |
| Surface pressure (MPa) | 300 |
| Sliding rate (m/s) | 3.50 |
| Testing time (s) | 150 |
| Test temperature (° C.) | 25 |

(4) Assessment of Effects
Friction Test
As a result of measuring the coefficient of friction at −30° C. with this barbell plate test, cases with a coefficient of friction of 0.160 or greater were assessed as "good", and cases with a coefficient of friction of less than 0.160 were assessed as "poor".
Wear Test
According to this barbell plate test, cases in which the wear mark was smaller than 1000 μm were assessed as "good", and cases in which the wear mark was 1000 μm or greater were assessed as "poor".

The results of using the grease compositions of Examples 1 to 7 and Comparative Examples 1 to 7 in friction tests and wear tests are shown in Table 2.

TABLE 2

|  | Examples | | | | | | |
|---|---|---|---|---|---|---|---|
|  | 1 | 2 | 3 | 4 | 5 | 6 | 7 |
| Base oil: methylphenyl silicone (A) (mass %) | 73.7 | 73.7 | 73.3 | 72.8 | 72.4 | 71.4 | 73.3 |
| Zinc dialkyldithiophosphate (B1) (mass %) | 2.0 | 4.0 | 2.5 | 3.0 | 3.5 | 1.0 | 2.5 |
| Zinc dialkyldithiocarbamate (B2) (mass %) | 11.3 | 9.3 | 11.3 | 11.3 | 11.3 | 15.0 | 11.3 |
| Li soap (C) (mass %) | 13.0 | 13.0 | 12.9 | 12.9 | 12.8 | 12.6 | 0.0 |
| Li complex soap (C) (mass %) | 0 | 0 | 0 | 0 | 0 | 0 | 12.9 |
| Coefficient of friction | 0.182 | 0.170 | 0.171 | 0.165 | 0.165 | 0.165 | 0.175 |
| Assessment of friction test results | ○ | ○ | ○ | ○ | ○ | ○ | ○ |
| Wear marks (μm) | 930 | 630 | 810 | 880 | 630 | 960 | 790 |
| Assessment of wear test results | ○ | ○ | ○ | ○ | ○ | ○ | ○ |

|  | Comparative Examples | | | | | | |
|---|---|---|---|---|---|---|---|
|  | 1 | 2 | 3 | 4 | 5 | 6 | 7 |
| Base oil: methylphenyl silicone (A) (mass %) | 83.3 | 81.6 | 78.2 | 80.75 | 77.1375 | 72.25 | 68.0 |
| Zinc dialkyldithiophosphate (B1) (mass %) | 2.0 | 4.0 | 8.0 | 0.0 | 0.0 | 0.0 | 0.0 |
| Zinc dialkyldithiocarbamate (B2) (mass %) | 0.0 | 0.0 | 0.0 | 5.0 | 9.3 | 15.0 | 20.0 |
| Li soap (C) (mass %) | 14.7 | 14.4 | 13.8 | 14.25 | 13.6125 | 12.75 | 12.0 |
| Coefficient of friction | 0.176 | 0.166 | 0.125 | 0.199 | 0.195 | 0.180 | 0.170 |
| Assessment of friction test results | ○ | ○ | x | ○ | ○ | ○ | ○ |
| Wear marks (μm) | 1680 | 1230 | 820 | 1570 | 1300 | 1230 | 1120 |
| Assessment of wear test results | x | x | ○ | x | x | x | x |

As described above, high friction characteristics and wear characteristics were achieved only when a combination of a zinc dialkyldithiophosphate and a zinc dialkyldithiocarbamate was used as an extreme-pressure additive. On the other hand, either the friction characteristics or the wear characteristics were poor when a zinc dialkyldithiophosphate or a zinc dialkyldithiocarbamate was used alone.

The invention claimed is:

1. A method for increasing the friction of a lubricating part of an overrunning clutch, the overrunning clutch having a clutch cam chamber formed from an outer clutch and an inner clutch, the method comprising enclosing a grease composition in the clutch cam chamber, wherein the grease composition comprises:
    a silicone oil (A);
    a zinc salt (B) containing, at a mass ratio from 1:99 to 40:60, a zinc dialkyldithiophosphate (B1) and a zinc dialkyldithiocarbamate (B2); and
    a thickener (C);
    wherein a content of the silicone oil (A) is in a range of not less than 50 mass % and not greater than 95 mass % relative to the entire grease composition;
    wherein the silicone oil (A) is a methylphenyl silicone, where the phenyl group content is from 3 to 10 mol % relative to all organic groups;
    wherein a content of the zinc salt (B) is not less than 5 mass % and not greater than 30 mass % relative to the entire grease composition;
    wherein the zinc dialkyldithiophosphate (B1) is bis(2-ethylhexyl)zinc dithiophosphate and the zinc dialkyldithiocarbamate (B2) is zinc dimethyldithiocarbamate;
    wherein the thickener (C) is a lithium complex soap that is a 4:1 mixture of lithium (12-hydroxystearate) and dilithium azelate salt;
    wherein a coefficient of friction (COF) of the lubricating part is increased to at least 0.160 relative to the lubricating part without the grease composition, where the COF is measured in accordance with a barbell plate test; and
    wherein the barbell plate test includes an opposite material with a barbell shape that is brought into contact with a plate surface, and the plate is rotated while applying a load in this state so as to slide the surface of the opposite material and the plate surface with continuous contact therebetween, where the opposite material is a Fe—Cr alloy steel formed from two discs 13 mm in diameter and 2 mm thick and a shaft connecting the central portions of these two discs, a portion of the opposite material which is in sliding contact with the plate surface is the peripheral edge portion of the discs, where the barbell-type test piece is formed from SCr415 steel and the plate-type test piece is formed from SUJ2 steel, where a state of cylindrical line contact is assumed so as to achieve a stable state of contact with little one-sided contact even under relatively low surface pressure conditions, where the test conditions are: 800N load, 1015 MPa surface pressure, 0.388 m/s sliding rate, 15 s test time, and −30° C. test temperature, and wherein the COF is measured by measuring the torque in the sliding direction with a load cell.

2. The method according to claim 1, wherein the zinc salt (B) contains the zinc dialkyldithiophosphate (B1) and the zinc dialkyldithiocarbamate (B2) at a mass ratio from 2:98 to 40:60.

3. The method according to claim 1, wherein the silicone oil (A) is of the general formula

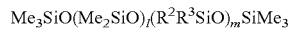

where Me is a methyl group, $R^2$ is a methyl group or a phenyl group, $R^3$ is a phenyl group, l is 0 or a positive integer, and m is a positive integer.

4. The method according to claim 1, wherein the grease composition further comprises a partial ester (D) of a polyhydric alcohol.

* * * * *